US012601856B2

(12) United States Patent
    Liu et al.

(10) Patent No.: US 12,601,856 B2
(45) Date of Patent: Apr. 14, 2026

(54) DEVICE AND METHOD FOR MULTI-ANGLE STEREOSCOPIC IMAGING MEASUREMENT OF PRECIPITATION PARTICLES

(71) Applicant: National University of Defense Technology, Changsha City (CN)

(72) Inventors: Xichuan Liu, Changsha (CN); Lei Liu, Changsha (CN); Qingwei Zeng, Changsha (CN); Shulei Li, Changsha (CN); Jinfeng Ding, Changsha (CN)

(73) Assignee: National University of Defense Technology, Changsha (CN)

( * ) Notice: Subject to any disclaimer, the term of this patent is extended or adjusted under 35 U.S.C. 154(b) by 95 days.

(21) Appl. No.: 18/674,826

(22) Filed: May 25, 2024

(65) Prior Publication Data

US 2025/0076538 A1    Mar. 6, 2025

(30) Foreign Application Priority Data

Sep. 5, 2023    (CN) .......................... 202311134599.3

(51) Int. Cl.
    *H04N 5/00*        (2011.01)
    *G01N 21/85*       (2006.01)
    (Continued)

(52) U.S. Cl.
    CPC .............. *G01W 1/14* (2013.01); *G01N 21/85* (2013.01); *G01N 2021/0112* (2013.01)

(58) Field of Classification Search
    USPC .......................................................... 348/46
    See application file for complete search history.

(56) References Cited

U.S. PATENT DOCUMENTS

| | | | |
|---|---|---|---|
| 4,936,828 A | 6/1990 | Chiang | |
| 11,300,832 B2* | 4/2022 | Kimura | ............. G02F 1/133608 |

(Continued)

FOREIGN PATENT DOCUMENTS

| | | |
|---|---|---|
| CN | 102183801 A | 9/2011 |
| CN | 202372654 U | 8/2012 |

(Continued)

OTHER PUBLICATIONS

T. J. Garrett et al., Fallspeed measurement and high-resolution multi-angle photography of hydrometeors in freefall. Atmos. Meas. Tech. Discuss, vol. 5. Date of issue: Dec. 31, 2012, pp. 4827-4850 (Related claims: 1).

(Continued)

*Primary Examiner* — Nigar Chowdhury
(74) *Attorney, Agent, or Firm* — Pilloff Passino & Cosenza LLP; Rachel K. Pilloff; Sean A. Passino

(57) ABSTRACT

Provided are a device and a method for multi-angle stereoscopic imaging measurement of precipitation particles, including an optical illumination unit used for illuminating a sampling space; a multi-angle imaging unit used for performing multi-angle imaging on the precipitation particles; a data acquisition control unit used for controlling the optical illumination unit and the multi-angle imaging unit; a data processing unit used for processing and displaying image data of the precipitation particles; and a protection unit used for protecting the optical illumination unit, the multi-angle imaging unit and the data acquisition control unit.

6 Claims, 3 Drawing Sheets

(51) Int. Cl.
    *G01W 1/14*         (2006.01)
    *G01N 21/01*      (2006.01)

(56)         References Cited

U.S. PATENT DOCUMENTS

| | | | | |
|---|---|---|---|---|
| 11,719,809 | B1 * | 8/2023 | Maschhoff | G01S 13/347 |
| | | | | 342/25 A |
| 2009/0073165 | A1 * | 3/2009 | McCullough | G01W 1/08 |
| | | | | 340/945 |
| 2015/0035944 | A1 | 2/2015 | Gao | |
| 2015/0204973 | A1 * | 7/2015 | Nohara | G01S 7/003 |
| | | | | 342/107 |
| 2015/0269779 | A1 * | 9/2015 | Wong | H04N 13/239 |
| | | | | 345/633 |
| 2018/0124328 | A1 * | 5/2018 | Liu | H04N 23/56 |
| 2018/0180733 | A1 * | 6/2018 | Smits | G06T 7/521 |
| 2019/0129435 | A1 * | 5/2019 | Madsen | A01B 69/008 |
| 2019/0138266 | A1 * | 5/2019 | Takechi | G06F 16/5866 |
| 2019/0317718 | A1 * | 10/2019 | George | G06F 3/167 |
| 2020/0074023 | A1 * | 3/2020 | Nizami | A01C 21/007 |
| 2020/0150268 | A1 * | 5/2020 | Maschhoff | G01S 13/955 |
| 2021/0180917 | A1 * | 6/2021 | Dikun | F41G 3/06 |
| 2021/0374967 | A1 * | 12/2021 | Ramanathan | G06T 7/194 |
| 2022/0171043 | A1 * | 6/2022 | Neumann | G01S 7/539 |
| 2023/0064675 | A1 * | 3/2023 | Higgins | H04N 13/167 |
| 2024/0214527 | A1 * | 6/2024 | Higgins | G06V 20/52 |

FOREIGN PATENT DOCUMENTS

| | | |
|---|---|---|
| CN | 103033857 A | 4/2013 |
| CN | 103592263 A | 2/2014 |
| CN | 103809224 A | 5/2014 |
| CN | 203745670 U | 7/2014 |
| CN | 104111485 A | 10/2014 |
| CN | 104976960 A | 10/2015 |
| CN | 105527290 A | 4/2016 |
| CN | 106546513 A | 3/2017 |
| CN | 109270066 A | 1/2019 |
| CN | 215867184 U | 2/2022 |
| CN | 114397255 A | 4/2022 |
| CN | 115755230 A | 3/2023 |
| CN | 116519715 A | 8/2023 |
| DE | 10314424 A1 | 10/2004 |
| DE | 102004016829 A1 | 11/2005 |
| JP | 2019023592 A | 2/2019 |

OTHER PUBLICATIONS

Wu Yi et al., Consistency analysis of precipitation observed by Parsivel laser raindrop spectrometer and rain gauge, Meteorological science and technology, issue 02. Date of issue: Apr. 15, 2020. (Full text. Related claims: 1-7).

Shu Xiaojian et al., Observation and analysis of raindrop shape based on precipitation microphysical characteristics measuring instrument. Meteorology, vol. 43, No. 1. Dec. 31, 2017. (Full text. Related claims: 1-7).

First Office Action from SIPO dated Apr. 9, 2024 in application No. 202311134599.3.

\* cited by examiner

DEVICE AND METHOD FOR MULTI-ANGLE STEREOSCOPIC IMAGING MEASUREMENT OF PRECIPITATION PARTICLES

CROSS-REFERENCE TO RELATED APPLICATIONS

This application claims priority to Chinese Patent Application No. 202311134599.3, filed on Sep. 5, 2023, the contents of which are hereby incorporated by reference.

TECHNICAL FIELD

The disclosure belongs to the technical field of meteorological automatic measurement, and in particular to a device and a method for multi-angle stereoscopic imaging measurement of precipitation particles.

BACKGROUND

In a process of precipitation particles falling from the air to the ground, fine microscopic characteristics, such as three-dimensional shape, scale, velocity and spectral distribution of hail and snowflake, vary complex. It is urgent to master these microscopic characteristics in the fields of numerical weather forecast, radar satellite remote sensing precipitation and electromagnetic wave effect evaluation, so as to improve the ability of heavy precipitation forecasting and early warning, disaster prevention and mitigation. In the existing meteorological scientific research and operational applications, one-dimensional or two-dimensional disdrometers are mainly used, and most of the instruments may only measure one-dimensional size or two-dimensional scale characteristics, so it is difficult to accurately measure three-dimensional characteristics of precipitation particles.

OTT PARSIVEL based on light intensity attenuation may calculate the horizontal scale and velocity of precipitation particles according to the light intensity attenuation and duration caused by precipitation particles passing through the light beam, but may not obtain the shape of precipitation particles. Two-dimensional (2D) video disdrometer based on double-line array scanning may measure the shape and velocity of precipitation particles according to two orthogonal parallel beams. However, the shape has a large splicing error and is easily influenced by wind. The instrument for measuring microphysical characteristics of precipitation based on area array imaging may obtain the two-dimensional shape, scale and velocity of precipitation particles synchronously through single frame and multiple exposures, but only one area array camera may not obtain the three-dimensional information. Three-dimensional characteristics of precipitation may be obtained and reconstructed by using two orthogonal array cameras. However, due to the extremely complex shape of solid precipitation, using only two angles is not enough to accurately depict the detailed information of precipitation. Multi-angle snowflake camera (MASC) may reconstruct the three-dimensional shape of snowflake by shooting snowflake images with three horizontally arranged area cameras. However, there are some problems such as lack of sampling angle, small effective sampling space and blurred image caused by depth of field effect, and the reconstruction effect is particularly unsatisfactory under strong wind conditions.

Overall, the ability to measure the three-dimensional microphysical characteristics of precipitation particles, especially solid non-spherical precipitation particles, is obviously insufficient, which is far from meeting urgent needs of meteorological and hydrological research, disaster prevention and mitigation, weather modification and other fields.

SUMMARY

In order to solve the above technical problems, the disclosure provides a device and a method for multi-angle stereoscopic imaging measurement of precipitation particles, and adopts a multi-eye stereoscopic vision imaging method and a double telecentric imaging technology to realize large-space sampling and three-dimensional stereoscopic imaging of precipitation particles.

In order to achieve the above objective, the disclosure discloses a device for multi-angle stereoscopic imaging measurement of precipitation particles, including an optical illumination unit used for illuminating a sampling space;

a multi-angle imaging unit used for performing multi-angle imaging on the precipitation particles;

a data acquisition control unit used for controlling the optical illumination unit and the multi-angle imaging unit;

a data processing unit used for processing and displaying image data of the precipitation particles; and a protection unit used for protecting the optical illumination unit, the multi-angle imaging unit and the data acquisition control unit.

Optionally, the multi-angle imaging unit includes: one high frame rate area array camera and a plurality of high-definition area array cameras;

the high frame rate area array camera is used for acquiring high frame rate continuous images of the precipitation particles; and the high-definition area array cameras are used for acquiring high-definition images of the precipitation particles.

Optionally, the plurality of high-definition area array cameras are erected and crossed at preset angles, and the high frame rate area array camera is placed right in a middle of the plurality of high-definition area array cameras;

among the plurality of high-definition area array cameras, at least two of the high-definition area array cameras are respectively placed on a left side and a right side of the high frame rate area array camera and horizontally placed; and one of the high-definition area array cameras is located above the high frame rate area array camera and placed obliquely;

optical axes of the high-definition area array cameras intersect with an optical axis of the high frame rate area array camera to form a stereoscopic sampling space; and the optical illumination unit is located at a same side of the plurality of high-definition area array cameras.

Optionally, the data acquisition control unit includes a trigger module, an exposure driving module, an image acquisition module and an image transmission module;

the trigger module is used for triggering the high frame rate area array camera;

the exposure driving module is used for starting the high-definition area array cameras and the optical illumination unit;

the image acquisition module is used for performing time pairing and encoding on the high frame rate continuous images and the high-definition images, and then transmitting encoded image data to the data processing unit in real time through the image transmission module.

Optionally, the data processing unit is used for preprocessing the high-definition images and acquiring microphysical parameters of the precipitation particles at different angles based on the high-definition images after the preprocessing, where the microphysical parameters include diameter, aspect ratio, cross-sectional area, perimeter and contour; and the data processing unit is used for realizing time sequence matching of the precipitation particles by using the microphysical parameters, and acquiring a movement speed of the precipitation particles according to a movement trajectory of the precipitation particles in continuous frame intervals.

Optionally, the preprocessing of the high-definition images by the data processing unit includes: matting, identifying and extracting regions of precipitation particle images, homogenizing regions of non-precipitation particle images, and realizing lossless compression of large-capacity high-definition images through a portable network graphics (PNG) compression algorithm.

In order to achieve the above objective, the disclosure also discloses a method for multi-angle stereoscopic imaging measurement of precipitation particles, including:

driving the high frame rate area array camera to scan at a first preset frequency by the trigger module, and detecting whether the precipitation particles exist by using inter-frame difference processing of the high frame rate continuous images; when there are no precipitation particles in the sampling space, not starting the high-definition area array cameras and exposure, and running in a monitoring state;

when the high frame rate area array camera detects the precipitation particles appeared in the sampling space, transmitting high-precision synchronous trigger pulses to the exposure driving module by the trigger module, and starting the plurality of high-definition area array cameras and the optical illumination unit to realize synchronous exposure of the precipitation particles at multiple angles;

under exposure of the optical illumination unit, simultaneously acquiring projection images of the precipitation particles at different angles at an acquisition rate of the first preset frequency by the plurality of high-definition area array cameras; and after the image acquisition module performs the time pairing and the encoding on the image data, transmitting the image data to the data processing unit in real time through the image transmission module;

under a control of an upper computer software, performing matting of the high-definition images, identifying and extracting regions of precipitation particle images, homogenizing regions of non-precipitation particle images, and realizing lossless compression of large-capacity high-definition images through a PNG compression algorithm by the data processing unit;

for the high frame rate continuous images obtained by the high frame rate area array camera, realizing time sequence matching of the precipitation particles by using characteristics of size, shape, gray level and contour of the precipitation particles, and calculating a movement speed of the precipitation particles according to a movement trajectory of the precipitation particles in continuous frame intervals;

for the high-definition images obtained by the high-definition area array cameras, calculating and obtaining microphysical parameters of diameter, aspect ratio, cross-sectional area, perimeter and contour of the precipitation particles at different angles by using mathematical morphology methods; and

for the high-definition images obtained by the plurality of high-definition area array cameras at different angles, reconstructing a three-dimensional contour of the precipitation particles by using a visible shell method, and obtaining three-dimensional characteristics such as equivalent diameter, three-dimensional orientation, sphericity, surface area and volume of the precipitation particles.

Compared with the prior art, the disclosure has following advantages and technical effects.

According to the device and the method for the multi-angle stereoscopic imaging measurement of the precipitation particles, a multi-eye stereoscopic imaging method and a double telecentric imaging technology are adopted, images of the precipitation particles at different angles are obtained by using the plurality of high-definition area array cameras, and the three-dimensional structure of the precipitation particles is reconstructed, so that the three-dimensional microphysical characteristics such as equivalent diameter, three-dimensional orientation, sphericity, surface area, volume and the like of the precipitation particles are calculated. Moreover, by using the high frame rate area array camera to detect the precipitation particles and to serve as a trigger for the high-definition area array cameras, the loss of the high-definition area array cameras and light emitting diode (LED) light sources during the no precipitation period is reduced. Not only may the three-dimensional structure information of the precipitation particles be accurately obtained, but also due to the use of ordinary high frame rate and high-definition area array cameras, the development and maintenance costs are low, and the device may operate unattended for a long time, which is convenient for scientific research and business application promotion.

BRIEF DESCRIPTION OF THE DRAWINGS

Attached drawings, which constitute a part of this disclosure, are used to provide a further understanding of this disclosure. Illustrative embodiments of this disclosure and descriptions of the embodiments are used to explain this disclosure, and do not constitute an improper limitation of this disclosure. In the attached drawings.

DETAILED DESCRIPTION OF THE EMBODIMENTS

It should be noted that embodiments in this disclosure and features in the embodiments may be combined with each other without conflict. The disclosure will be described in detail with reference to attached drawings and embodiments.

It should be noted that steps shown in a flowchart of the attached drawings may be executed in a computer system such as a set of computer-executable instructions, and although a logical order is shown in the flowchart, in some cases, the steps shown or described may be executed in a different order from here.

An objective of this embodiment is to propose a method for effectively obtaining three-dimensional structure information of precipitation particles. Based on this objective, this embodiment proposes a device and a method for multi-angle stereoscopic imaging measurement of precipitation particles.

Figure 1:
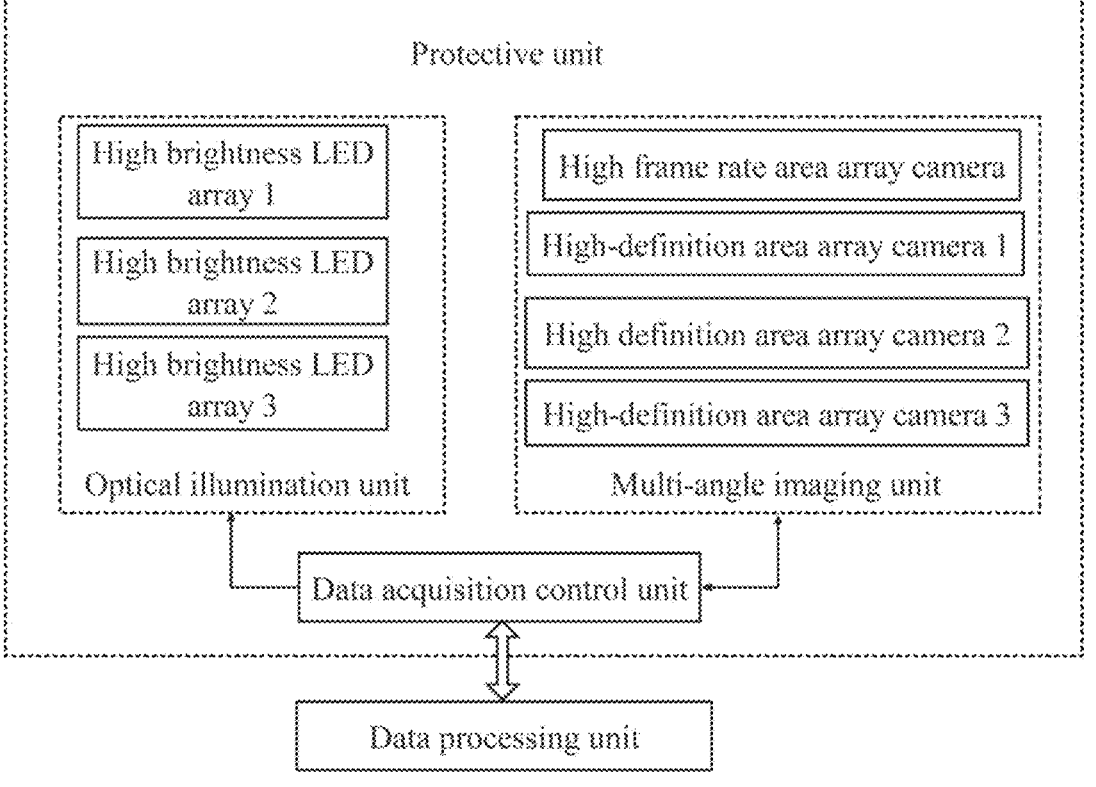
FIG. 1 is a structural block diagram of a device for multi-angle stereoscopic imaging measurement of precipitation particles according to an embodiment of the disclosure.

As shown in FIG. 1, a device for multi-angle stereoscopic imaging measurement of precipitation particles mainly includes an optical illumination unit, a multi-angle imaging unit, a data acquisition control unit, a data processing unit and a protection unit. The optical illumination unit includes three groups of high-brightness LED arrays for illuminating a sampling space. The multi-angle imaging unit includes one high frame rate area array camera and three high-definition area array cameras, where the three high-definition area array cameras are erected and crossed at a certain angle, and a field of view crossing space is the sampling space, and the high frame rate area array camera and the sampling space of the three high-definition area array cameras is overlapped for synchronously triggering the three high-definition area array cameras. The data acquisition control unit includes a trigger module, an exposure driving module, an image acquisition module and an image transmission module, and realizes functions of controlling the optical illumination unit and the multi-angle imaging unit, image acquisition and transmission, etc. The data processing unit includes a computer terminal and an upper computer software, and realizes functions such as real-time display, three-dimensional effect viewing, data compression and storage of precipitation particle images. The protection unit is used for protecting the optical illumination unit, the multi-angle imaging unit and the data acquisition control unit to ensure a long-term stable and reliable operation of the device under natural conditions.

Figure 2:
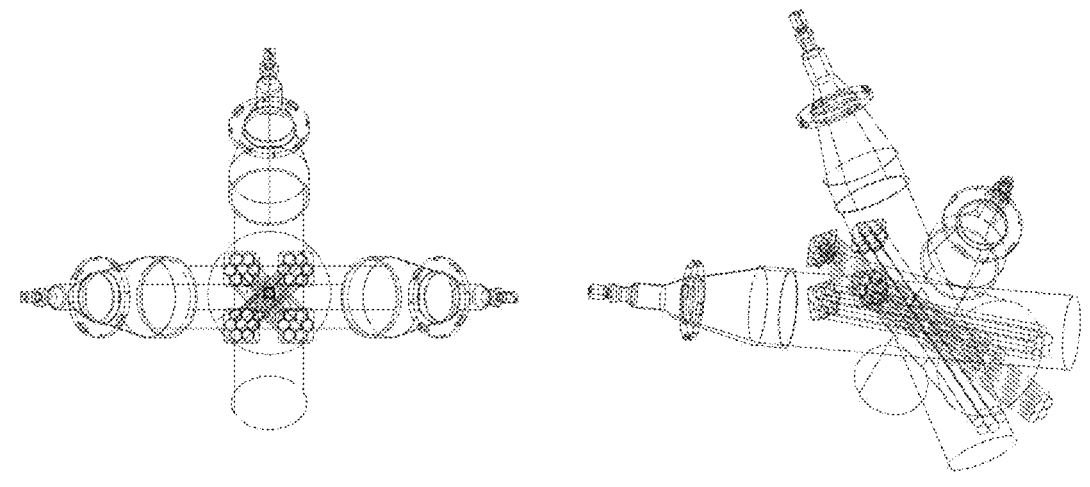
FIG. 2 is a schematic diagram of an optical path according to an embodiment of the disclosure.

In the multi-angle imaging unit, the high frame rate area array camera is placed horizontally and centrally. Two of the high-definition area array cameras are placed on a left side and a right side of the high frame rate area array camera respectively and horizontally. One of the high-definition area array cameras is located above the high frame rate area array camera and placed obliquely. Each of the three groups of high-brightness LED arrays are located on a same side of each of the three high-definition area array cameras to illuminate the sampling space, and an imaging optical path is shown in FIG. 2.

The high-definition area array cameras adopt large-aperture double telecentric lenses, and the high frame rate area array camera adopts a small-aperture non-telecentric lens. An optical axis of the each of the high-definition area array cameras intersects with an optical axis of the high frame rate area array camera to form a three-dimensional sampling space.

The high-definition area array cameras are not on a same horizontal plane, and a number of the high-definition area array cameras is not less than three, and an included angle between the cameras is adjustable within a range of 15°-90°.

An exposure time of the each of the high-definition area array cameras depends on a lighting time of a high-brightness LED. Single frame single exposure and single frame multiple exposure may be used. A single exposure time may be adjusted in a range of 1 microsecond (μs)-1 millisecond (ms), and an exposure interval may be adjusted in a range of 1 μs-1 ms.

For high-precision synchronous exposure of the high-definition area array cameras, a high-precision clock manager outputs multi-channel high-precision pulse signals, and a synchronous trigger delay does not exceed 10 nanosecond (ns).

The high-brightness LED arrays are on a same side as the high-definition area array cameras, and image the precipitation particles by receiving backscattered and reflected light.

Figure 3:
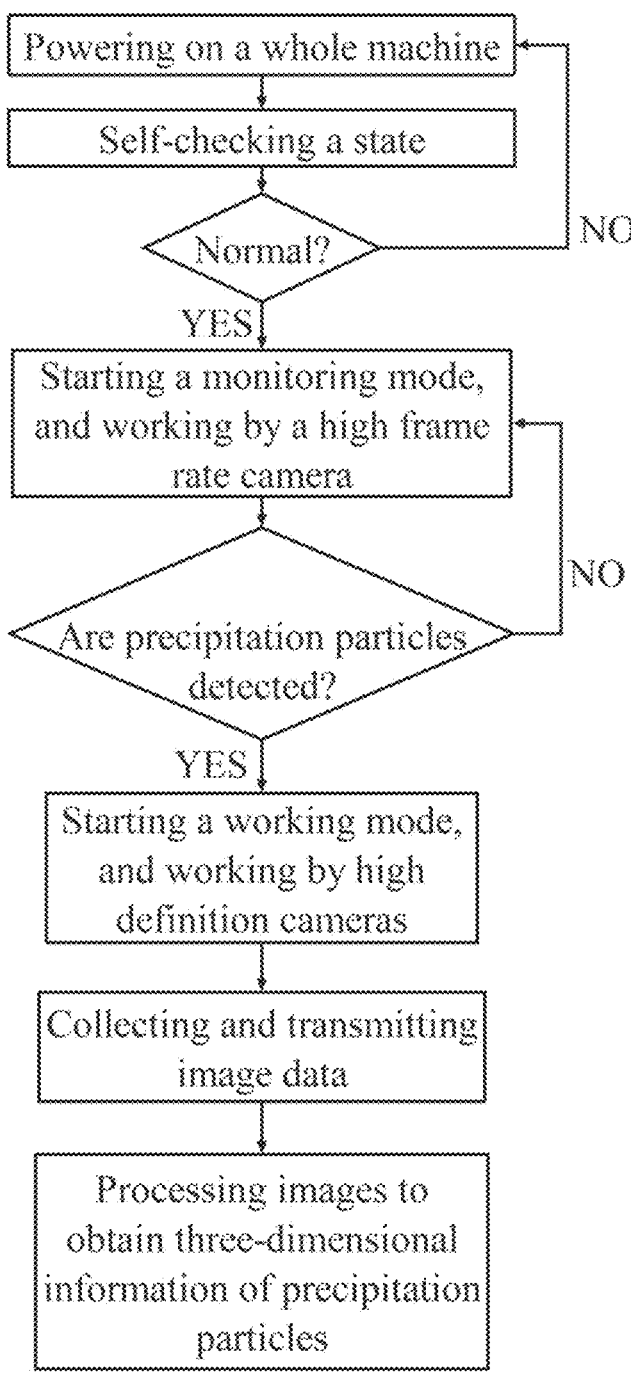
FIG. 3 is a working flow chart of an embodiment of the disclosure.

This embodiment also discloses a method for multi-angle stereoscopic imaging measurement of precipitation particles, as shown in FIG. 3, including following steps:

(1) driving the high frame rate area array camera to scan at a speed of not less than 200 frames per second (frame/s) by the trigger module, and detecting whether the precipitation particles exist by using inter-frame difference processing of high frame rate continuous images; when there are no precipitation particles in the sampling space, not starting the high-definition area array cameras and exposure, and running in a monitoring state;

(2) when the high frame rate area array camera detects the precipitation particles appeared in the sampling space, transmitting high-precision synchronous trigger pulses to the exposure driving module by the trigger module, and starting the three high-definition area array cameras and the three groups of high-brightness LED arrays to realize synchronous exposure of the precipitation particles at multiple angles;

(3) under rapid exposure of the three groups of high-brightness LEDs, simultaneously acquiring projection images of the precipitation particles at different angles at an acquisition rate of not less than 5 frame/s by the three high-definition area array cameras;

(4) after the image acquisition module performs time pairing and encoding on image data, transmitting the image data to the data processing unit in real time through the image transmission module;

(5) under a control of the upper computer software, performing matting of the high-definition images, identifying and extracting regions of the precipitation particle images, homogenizing regions of non-precipitation particle images, and realizing lossless compression of large-capacity high-definition images through a PNG compression algorithm by the data processing unit;

(6) for the high frame rate continuous images obtained by the high frame rate area array camera, realizing the time sequence matching of the precipitation particles by using characteristics such as size, shape, gray level and contour of the precipitation particles, and calculating a movement speed of the precipitation particles according to a movement trajectory of the precipitation particles in continuous frame intervals;

(7) for the high-definition images obtained by the high-definition area array cameras, calculating and obtaining microphysical parameters such as diameter, aspect ratio, cross-sectional area, perimeter and contour of the precipitation particles at different angles by including but not limited to using mathematical morphology methods; and (8) for multi-angle stereoscopic images, reconstructing a three-dimensional contour of the precipitation particles by including but not limited to using a visible shell method, and calculating three-dimensional characteristics such as equivalent diameter, three-dimensional orientation, sphericity, surface area and volume of the precipitation particles.

The above is only the preferred embodiment of this disclosure, but a protection scope of this disclosure is not limited to this. Any change or replacement that may be easily thought of by a person familiar with this technical field within a technical scope disclosed in this disclosure should be included in the protection scope of this disclosure. Therefore, the protection scope of this disclosure should be based on a protection scope of the claims.

What is claimed is:

1. A device for multi-angle stereoscopic imaging measurement of precipitation particles, comprising:
    an optical illumination unit used for illuminating a sampling space;
    a multi-angle imaging unit used for performing multi-angle imaging on the precipitation particles;
    a data acquisition control unit used for controlling the optical illumination unit and the multi-angle imaging unit;
    a data processing unit used for processing and displaying image data of the precipitation particles; and
    a protection unit used for protecting the optical illumination unit, the multi-angle imaging unit and the data acquisition control unit to ensure a long-term stable and reliable operation of the optical illumination unit, the multi-angle imaging unit and the data acquisition control unit under natural conditions;
    the multi-angle imaging unit comprises: one high frame rate area array camera and a plurality of high-definition area array cameras; wherein
    the high frame rate area array camera is used for acquiring high frame rate continuous images of the precipitation particles; and
    the high-definition area array cameras are used for acquiring high-definition images of the precipitation particles.

2. The device for the multi-angle stereoscopic imaging measurement of the precipitation particles according to claim 1, wherein,
    the plurality of high-definition area array cameras are erected and crossed at preset angles, and the high frame rate area array camera is placed right in a middle of the plurality of high-definition area array cameras;
    among the plurality of high-definition area array cameras, at least two of the high-definition area array cameras are respectively placed on a left side and a right side of the high frame rate area array camera and horizontally placed; and one of the high-definition area array cameras is located above the high frame rate area array camera and placed obliquely;
    optical axes of the high-definition area array cameras intersect with an optical axis of the high frame rate area array camera to form a stereoscopic sampling space; and
    the optical illumination unit is located at a same side of the plurality of high-definition area array cameras.

3. The device for the multi-angle stereoscopic imaging measurement of the precipitation particles according to claim 1, wherein the data acquisition control unit comprises a trigger module, an exposure driving module, an image acquisition module and an image transmission module;
    the trigger module is used for triggering the high frame rate area array camera;
    the exposure driving module is used for starting the high-definition area array cameras and the optical illumination unit;
    the image acquisition module is used for performing time pairing and encoding on the high frame rate continuous images and the high-definition images, and then transmitting encoded image data to the data processing unit in real time through the image transmission module.

4. The device for the multi-angle stereoscopic imaging measurement of the precipitation particles according to claim 1, wherein,
    the data processing unit is used for preprocessing the high-definition images and acquiring microphysical parameters of the precipitation particles at different angles based on the high-definition images after the preprocessing, wherein the microphysical parameters comprise diameter, aspect ratio, cross-sectional area, perimeter and contour; and
    the data processing unit is used for realizing time sequence matching of the precipitation particles by using the microphysical parameters, and acquiring a movement speed of the precipitation particles according to a movement trajectory of the precipitation particles in continuous frame intervals.

5. The device for the multi-angle stereoscopic imaging measurement of the precipitation particles according to claim 4, wherein the preprocessing of the high-definition images by the data processing unit comprises: matting, identifying and extracting regions of precipitation particle images, homogenizing regions of non-precipitation particle images, and realizing lossless compression of large-capacity high-definition images through a portable network graphics (PNG) compression algorithm.

6. A method for multi-angle stereoscopic imaging measurement of precipitation particles, adopting the device for the multi-angle stereoscopic imaging measurement of the precipitation particles according to claim 1, comprising:
    driving the high frame rate area array camera to scan at a first preset frequency by a trigger module, and detecting whether the precipitation particles exist by using an inter-frame difference processing of high frame rate continuous images; when there are no precipitation particles in the sampling space, not starting the high-definition area array cameras and exposure, and running in a monitoring state;
    when the high frame rate area array camera detects the precipitation particles appeared in the sampling space, transmitting high-precision synchronous trigger pulses to an exposure driving module by the trigger module, and starting the plurality of high-definition area array cameras and the optical illumination unit to realize synchronous exposure of the precipitation particles at different angles;
    under exposure of the optical illumination unit, simultaneously acquiring projection images of the precipitation particles at different angles at an acquisition rate of the first preset frequency by the plurality of high-definition area array cameras; and after an image acquisition module performs time pairing and encoding on the image data, transmitting the image data to the data processing unit in real time through an image transmission module;
    under a control of an upper computer software, performing matting of the high-definition images, identifying and extracting regions of precipitation particle images, homogenizing regions of non-precipitation particle images, and realizing lossless compression of large-capacity high-definition images through a PNG compression algorithm by the data processing unit;
    for the high frame rate continuous images obtained by the high frame rate area array camera, realizing time sequence matching of the precipitation particles by using characteristics of size, shape, gray level and contour of the precipitation particles, and calculating a movement speed of the precipitation particles according to a movement trajectory of the precipitation particles in continuous frame intervals;

for the high-definition images obtained by the high-definition area array cameras, calculating and obtaining microphysical parameters of diameter, aspect ratio, cross-sectional area, perimeter and contour of the precipitation particles at different angles by using mathematical morphology methods; and for the high-definition images obtained by the plurality of high-definition area array cameras at different angles, reconstructing a three-dimensional contour of the precipitation particles by using a visible shell method, and obtaining three-dimensional characteristics such as equivalent diameter, three-dimensional orientation, sphericity, surface area and volume of the precipitation particles.

* * * * *